(12) United States Patent
Karp et al.

(10) Patent No.: US 8,683,072 B1
(45) Date of Patent: Mar. 25, 2014

(54) CONTROLLING FREQUENCY OF DATA TRANSFER

(75) Inventors: Alan H. Karp, Palo Alto, CA (US); Ashwin Swaminathan, Greenbelt, MD (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1897 days.

(21) Appl. No.: 11/796,017

(22) Filed: Apr. 25, 2007

(51) Int. Cl.
*G06F 15/16* (2006.01)

(52) U.S. Cl.
USPC .......................................... 709/232

(58) Field of Classification Search
USPC .................................. 709/203, 227, 229, 232
See application file for complete search history.

(56) References Cited

U.S. PATENT DOCUMENTS

2007/0266256 A1* 11/2007 Shah et al. ..................... 713/178
2008/0189711 A1* 8/2008 Cavage et al. ................ 718/102

* cited by examiner

*Primary Examiner* — Jason Recek

(57) ABSTRACT

A method for controlling frequency of data transfer of an electronic device is disclosed. A time stamp is fetched over a network connection, wherein the time stamp is not modifiable at the electronic device. The time stamp is stored at the electronic device. In response to a request to transfer digital content, it is determined whether a predetermined time interval since a most recent transfer of the digital content has elapsed.

18 Claims, 4 Drawing Sheets

CONTROLLING FREQUENCY OF DATA TRANSFER

FIELD

The field of the present technology relates to data management.

BACKGROUND

Since the advent of the personal computer, transferring large amounts of digital content has become much easier. Digital content providers have become concerned that computer users may transfer its copyrighted or published materials to others in mass quantities. Consequently, in order to counteract a user's ability to transfer digital content, providers have used management schemes which slow or stop the rate of data transfer.

For example, one digital rights mechanism which attempts to control both access to and usage of digital data includes the modification of a digital media player's software to include cryptographic controls. Another management mechanism is that of software/firmware-embedded hardware controls which interact with an operating system and/or media player software. Legislation and regulations have also been enacted to help manage access to and usage of digital data or hardware.

However, there exist many limitations to the current state of technology with respect to data management mechanisms. For example, cryptographic controls may be reversed engineered. Additionally, software/firmware-embedded hardware controls are vulnerable to attack via tampering. Furthermore, legislation and regulations do not always have the intended affect of reducing or stopping the rate of data transfer.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Various embodiments of the present invention, a method for controlling frequency of data transfer of an electronic device, are described. In one embodiment, a time stamp is fetched over a network connection, wherein the time stamp is not modifiable at the electronic device. The time stamp is stored at the electronic device. In response to a request to transfer digital content, it is determined whether a predetermined time interval since a most recent transfer of the digital content has elapsed.

BRIEF DESCRIPTION OF THE DRAWINGS

The accompanying drawings, which are incorporated in and form a part of this specification, illustrate embodiments of the technology for providing a method for controlling frequency of data transfer of an electronic device and, together with the description, serve to explain the principles discussed below.

Figure 1:
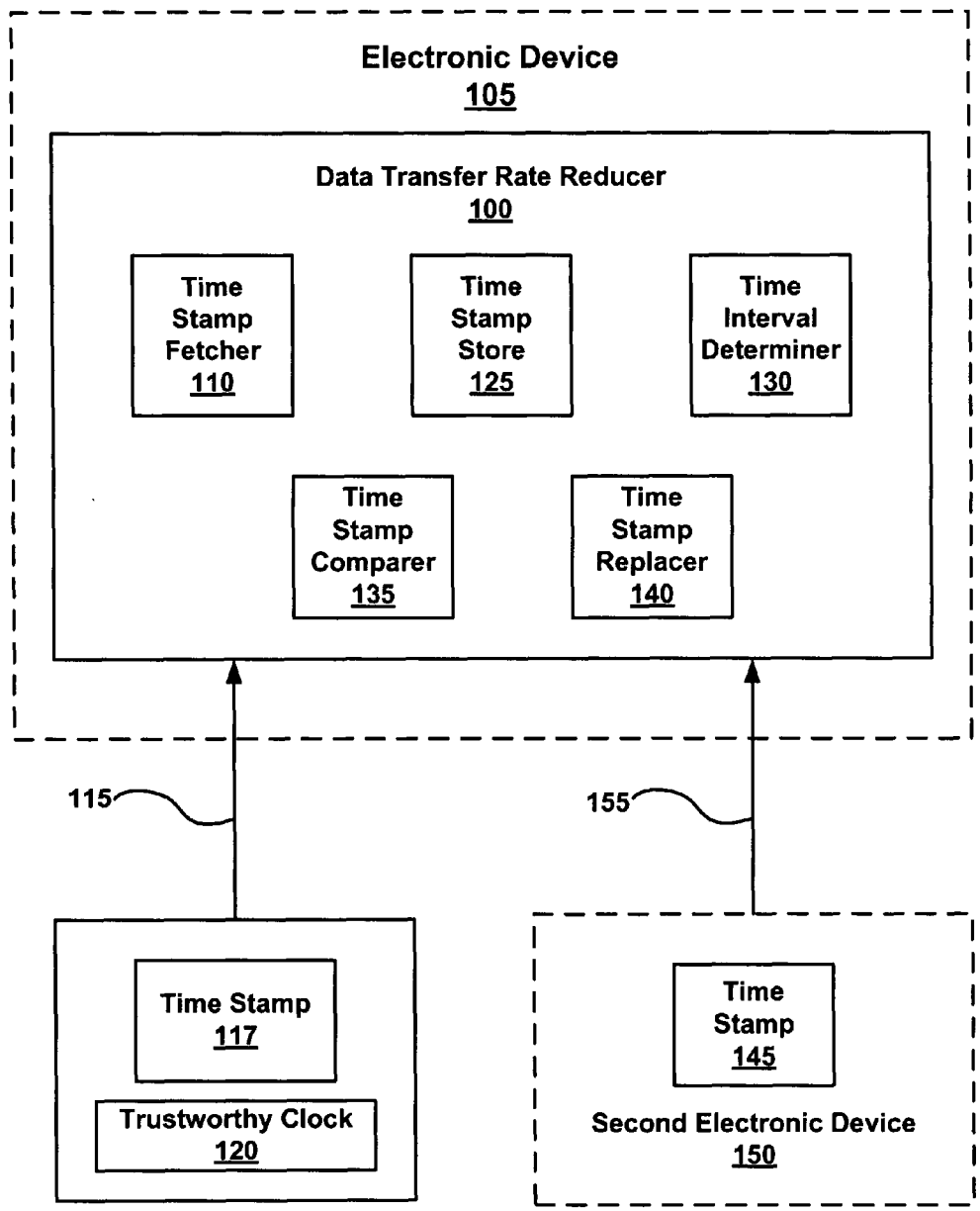
FIG. 1 is a block diagram of an example data transfer rate reducer in accordance with embodiments of the present technology.

The drawings referred to in this description should be understood as not being drawn to scale except if specifically noted.

DETAILED DESCRIPTION

Reference will now be made in detail to embodiments of the present technology, examples of which are illustrated in the accompanying drawings. While the technology will be described in conjunction with various embodiment(s), it will be understood that they are not intended to limit the present technology to these embodiments. On the contrary, the present technology is intended to cover alternatives, modifications and equivalents, which may be included within the spirit and scope the various embodiments as defined by the appended claims.

Furthermore, in the following detailed description, numerous specific details are set forth in order to provide a thorough understanding of the present technology. However, the present technology may be practiced without these specific details. In other instances, well known methods, procedures, components, and circuits have not been described in detail as not to unnecessarily obscure aspects of the present embodiments.

Unless specifically stated otherwise as apparent from the following discussions, it is appreciated that throughout the present detailed description, discussions utilizing terms such as "fetching", "storing", "determining", "establishing", "accessing", "retrieving", "comparing", "replacing", "blocking", or the like, refer to the actions and processes of a computer system, or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices. The present technology is also well suited to the use of other computer systems such as, for example, optical and mechanical computers.

The discussion will begin with an overview of the process of managing data transfers and its resulting problems. The discussion will then focus on embodiments of the present technology that provide a data transfer rate reducer for controlling frequency of data transfer of an electronic device. The discussion will then focus on the method for controlling frequency of data transfer of an electronic device.

Overview

With the advent of personal computers, it has become much easier for digital data or hardware to be copied and transferred to another. Consequently, Digital Rights Management systems have been developed to manage and/or reduce this copying. "Digital Rights Management" (DRM) is a term that refers to any of several technologies used by publishers or copyright owners to control access to and the usage of digital data or hardware. Additionally, DRM also refers to restrictions associated with a specific instance of a digital work or device.

One DRM mechanism developed to reduce the rate of copying is 'friction'. Friction requires that a pre-determined minimum amount of time must have elapsed between the last transfer of digital content and the current attempt to transfer the same digital content. If this pre-determined time has not elapsed, the transfer of the digital content will not be permitted. Friction necessitates the presence of a clock in order to determine if a certain time has elapsed.

Generally, when one electronic device is connected to another electronic device on-line, the party mediating the transfer (such as the digital content provider) may control the clock used to determine the passage of time. Additionally, as part of its DRM policy, the party mediating the transfer may also specify another party to have a trusted clock which may be used to determine the passage of time.

For example, suppose friction requires that a party can only transfer certain digital content once every hour. Once the hour has passed, the party may transfer the digital content. However, the party has to wait another hour before another copy can be transferred. Consequently, it takes a thousand hours to transfer a thousand copies. The presence of a clock is an integral part of friction.

However, during an off-line transfer of digital content, a digital content provider may no longer have control over these transfers or which clock may be used. Even though the digital content provider has set a friction time interval as part of its DRM policy, a party may access its computer's own internal clock to determine the passage of time. This approach is problematic if the system clock is under the control of a party who may wish to violate the transfer restrictions.

For example, friction permits a party to transfer certain digital content once every hour. The party then resets the clock relied upon to an hour ahead, and then transfers the digital content. The benefit of friction has been lost because the party reset a clock to an hour ahead instead of waiting for the hour to pass. Additionally, some devices may not even have a clock.

Even though a tamper resistant clock can be provided on an electronic device, such a clock would be a constant power drain. Additionally, these tamper resistant clocks need a way in which to be reset should the device's power fail. Such a mechanism to reset this clock could be used to circumvent the transfer restrictions.

Embodiments of the present technology provide a method for controlling the frequency of data transfer of an electronic device without a secure local clock. For example, the present technology initially fetches a time stamp over a network connection, wherein the time stamp is not modifiable at the electronic device. The time stamp is stored at the electronic device. Then, in response to a request to transfer a digital content, the present technology determines whether a predetermined time interval since a most recent transfer of the digital content has elapsed.

Architecture

With reference now to 100 of FIG. 1, a block diagram of one embodiment of data transfer rate reducer 100 for controlling the frequency of data transfer of an electronic device is shown. In one embodiment, data transfer rate reducer 100 comprises time stamp fetcher 110, time stamp store 125, and time interval determiner 130. Line 115 represents the network connection by which time stamp 117 is being sent from trustworthy clock 120 to data transfer rate reducer 100. In one instance of the present technology, network is defined as two or more computers connected together to form a network. Data transfer rate reducer 100 may be integrated within electronic device 105, or communicatively coupled thereto. For example, electronic device 105 may be a digital music player, such as an MP3 player. However, it should be appreciated that electronic device 105 may include any type of electronic device that is capable of transferring data.

In one embodiment, time stamp fetcher 110 is configured to fetch time stamp 117 over a network connection from trustworthy clock 120, wherein time stamp 117 is not modifiable at electronic device 105. Time stamp 117 is a representation of the current time as calculated by trustworthy clock 120, and does not change once in time stamp 117 form. It should be appreciated that in various embodiments time stamp 117 is unforgettable, e.g., tamper resistant.

In one embodiment, time stamp 117 is comprised within a digital certificate. In another embodiment, time stamp 117 is for storage within a counter stored in a portion of a memory device of electronic device 105 or some other electronic device. The memory device which includes time stamp 117 may be comprised within a trusted platform module (TPM) microcontroller.

For example, an electronic device may contain a TPM on one of its computer chips. That TPM stores secured information such as time stamp 117 within its memory module, and is not accessible to the owner of electronic device 105. Time stamp 117 may be in the form of a digital certificate, a counter, or some other fetchable form.

Figure 2:
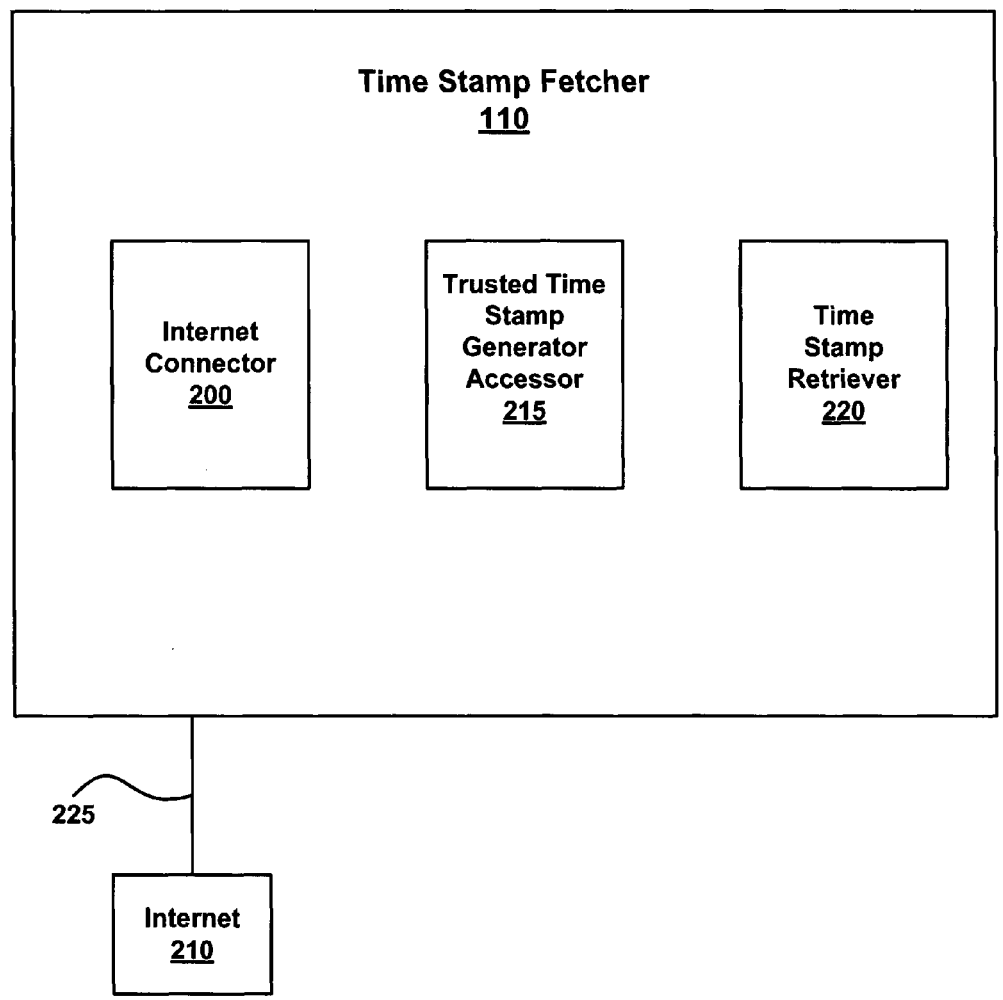
FIG. 2 is a block diagram of an example time stamp fetcher in accordance with one embodiment of the present technology.

Referring now to FIG. 2 and to FIG. 1, in one instance of the present technology, time stamp fetcher 110 comprises Internet connector 200, trusted time stamp generator accessor 215, and time stamp retriever 220. Time stamp fetcher 110 and/or any of its components may be communicatively coupled to Internet 210. Line 225 represents the Internet connection by which time stamp fetcher 110 and its components therein use to connect, access, and retrieve time stamp 117.

In one embodiment, Internet connector 200 is configured to establish an Internet connection. Trusted time stamp generator accessor 215 is configured to access a trusted time stamp generator over the Internet connection which was established by Internet connector 200. A trusted time stamp generator is an electronic device or part of an electronic device which is recognized by the digital content provider as generating an authorized time.

For example, the digital content provider may embed a list of one or more authorized time providers within the digital content itself, electronic device 105, or data transfer rate reducer 100. The authorized time provider will generate time stamp 117 that is accessible by data transfer rate reducer 100 and/or trusted time stamp generator accessor 215.

In one instance of the present technology, time stamp retriever 220 is configured to retrieve time stamp 117 from the trusted time stamp generator. It is appreciated that each module within time stamp fetcher 110, (such as Internet connector 200, trusted time stamp generator accessor 215, and time stamp retriever 220) may be communicatively coupled to any other module within time stamp fetcher 110 and/or Internet 210.

Referring again to FIG. 1, in one embodiment, time stamp store 125 is configured to store time stamp 117 at an electronic device. While time stamp 117 is being stored, its contents do not change and are not modifiable.

In one embodiment, time interval determiner 130 is configured to determine whether a predetermined time interval since a most recent transfer of a first digital content has elapsed, in response to a request to transfer the first digital content. The pre-determined time interval may be embedded within data transfer rate reducer 100, electronic device 105, or within the digital content itself. The pre-determined time interval may even be received from the content provider during the process of attempting to transfer data.

For example, the most recent transfer of digital content may be the last transfer of the first digital content which electronic device 105 made. In another example, the most recent transfer of digital content may be the original implantation of the digital content onto electronic device 105 or data transfer rate reducer 100. Furthermore, in another instance, a transfer blocker is configured to block a transfer of the digital content if the predetermined time interval has not elapsed.

In one embodiment of the present technology, the request to transfer digital content to second electronic device 150 further comprises time stamp comparer 135 and time stamp replacer 140. Time stamp comparer 135 is configured to compare time stamp 117 to a second time stamp 145 stored at second electronic device 150, wherein the time stamp 145 is not modifiable at second electronic device 150. It is appreciated that time stamp 145 may not be modified by electronic device 105.

Additionally, line 155 represents the pathway of time stamp 145 being sent from second electronic device 150 to data transfer rate reducer 100 or to any component within data transfer rate reducer 100.

In one instance, second electronic device 150 has time stamp 145 which is a trusted time stamp authorized by the digital content provider. It is appreciated that second electronic device 150 may have performed the method of controlling frequency of data transfer of an electronic device in order to receive its time stamp 145. Additionally, second electronic device 150 may have a data transfer rate reducer of its own or be communicatively coupled to a data transfer rate reducer 100.

In another embodiment, time stamp replacer 140 is configured to replace the time stamp 117 with time stamp 145 if time stamp 145 is older than time stamp 117. The term "older" indicates that the time on time stamp 145 is more recent than the time on time stamp 117. It is appreciated that the term "older" may also indicate that the time on any other time stamp from a trustworthy clock is more recent than time stamp 117.

Operation

Figure 3:
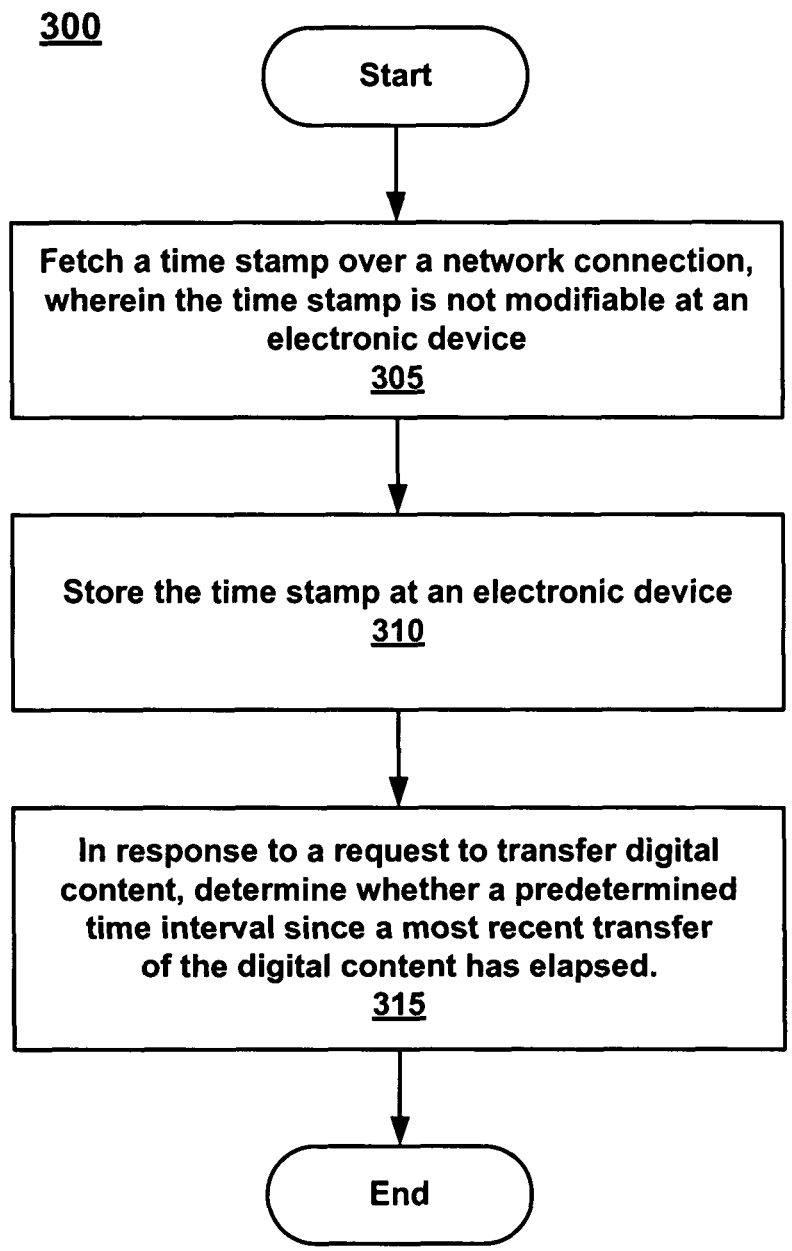
FIG. 3 is a flowchart of an example method for controlling frequency of data transfer in accordance with one embodiment of the present technology.

With reference now to FIG. 3, a flowchart 300 of an example method for controlling frequency of data transfer of an electronic device is shown in accordance with one embodiment of the present technology.

Referring now to 305 of FIG. 3 and to FIG. 1, one embodiment fetches time stamp 117 over a network connection, wherein time stamp 117 is not modifiable at electronic device 105. For example, time stamp fetcher 110 fetches time stamp 117 from trustworthy clock 120 over network connection 115.

Referring now to 305 of FIG. 3, FIG. 1, and FIG. 2, in one embodiment, fetching time stamp 117 over network connection 115 comprises establishing an Internet connection, accessing a trusted time stamp generator over an internet connection, and retrieving time stamp 117. For example, Internet Connector 200 may establish an internet connection. Trusted time stamp generator accessor 215 may access a trusted time stamp generator over internet connection 225. Additionally, time stamp retriever 220 may retrieve time stamp 117 from a trusted time stamp generator.

Another embodiment of the present invention blocks the transfer of the digital content if the predetermined time interval has not elapsed.

As already described herein, time stamp 117 may be comprised within a digital certificate. Additionally, time stamp 117 may be comprised within a counter that is stored in a portion of a memory device of electronic device 105 that is inaccessible by a user. It is appreciated that the counter that is stored in a portion of a memory device may be within electronic device 105, or within another electronic device.

Furthermore, as already described herein, the memory device is comprised within a TPM microcontroller. Additionally, TPM may be a tamper resistant TPM microcontroller.

In one embodiment, the request for transferring digital content to second electronic device 150 further comprises comparing time stamp 117 to a second time stamp 145 at second electronic device 150, wherein second time stamp 145 is not modifiable at second electronic device 150. Furthermore, if time stamp 117 is older than second time stamp 145, one embodiment replaces time stamp 117 with second time stamp 145.

Referring to 310 of FIG. 3 and FIG. 2, one embodiment stores time stamp 117 at electronic device 105. As shown by 315 of FIG. 3, another embodiment determines whether a predetermined time interval since a most recent transfer of digital content has elapsed, in response to a request to transfer digital content.

Example Computer System Environment

Figure 4:
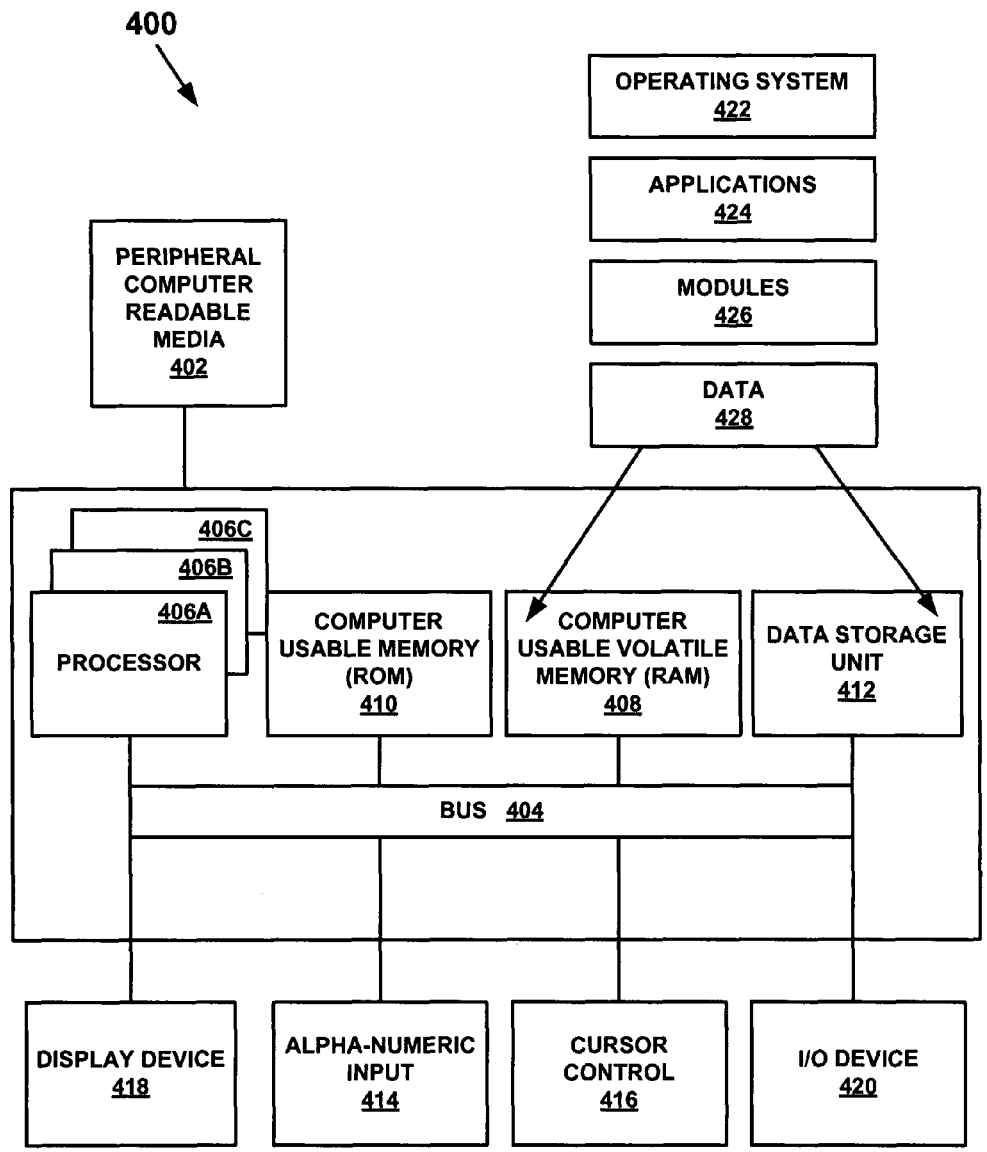
FIG. 4 is a diagram of an example computer system used in accordance with embodiments of the present technology for controlling frequency of data transfer of an electronic device in accordance with one embodiment of the present technology.

With reference now to FIG. 4, portions of the technology for providing a method for controlling frequency of data transfer of an electronic device are composed of computer-readable and computer-executable instructions that reside, for example, in computer-usable media of a computer system. That is, FIG. 4 illustrates one example of a type of computer that can be used to implement embodiments, which are discussed below, of the present technology.

FIG. 4 illustrates an example computer system 400 used in accordance with embodiments of the present technology. It is appreciated that system 400 of FIG. 4 is an example only and that the present technology can operate on or within a number of different computer systems including general purpose networked computer systems, embedded computer systems, routers, switches, server devices, consumer devices, various intermediate devices/artifacts, stand alone computer systems, and the like. As shown in FIG. 4, computer system 400 of FIG. 4 is well adapted to having peripheral computer readable media 402 such as, for example, a floppy disk, a compact disc, and the like coupled thereto.

System 400 of FIG. 4 includes an address/data bus 404 for communicating information, and a processor 406A coupled to bus 404 for processing information and instructions. As depicted in FIG. 4, system 400 is also well suited to a multi-processor environment in which a plurality of processors 406A, 406B, and 406C are present. Conversely, system 400 is also well suited to having a single processor such as, for example, processor 406A. Processors 406A, 406B, and 406C may be any of various types of microprocessors. System 400 also includes data storage features such as a computer usable volatile memory 408, e.g. random access memory (RAM), coupled to bus 404 for storing information and instructions for processors 406A, 406B, and 406C.

System 400 also includes computer usable non-volatile memory 410, e.g. read only memory (ROM), coupled to bus 404 for storing static information and instructions for processors 406A, 406B, and 406C. Also present in system 400 is a data storage unit 412 (e.g., a magnetic or optical disk and disk drive) coupled to bus 404 for storing information and instructions. System 400 also includes an optional alphanumeric input device 414 including alphanumeric and function keys coupled to bus 404 for communicating information and command selections to processor 406A or processors 406A, 406B, and 406C. System 400 also includes an optional cursor control device 416 coupled to bus 404 for communicating user input information and command selections to processor 406A or processors 406A, 406B, and 406C. System 400 of the present embodiment also includes an optional display device 418 coupled to bus 404 for displaying information.

Referring still to FIG. 4, optional display device 418 of FIG. 4 may be a liquid crystal device, cathode ray tube, plasma display device or other display device suitable for creating graphic images and alphanumeric characters recognizable to a user. Optional cursor control device 416 allows the computer user to dynamically signal the movement of a visible symbol (cursor) on a display screen of display device 418. Many implementations of cursor control device 416 are known in the art including a trackball, mouse, touch pad, joystick or special keys on alpha-numeric input device 414 capable of signaling movement of a given direction or manner of displacement. Alternatively, it will be appreciated that a cursor can be directed and/or activated via input from alpha-numeric input device 414 using special keys and key sequence commands.

System 400 is also well suited to having a cursor directed by other means such as, for example, voice commands. System 400 also includes an I/O device 420 for coupling system 400 with external entities. For example, in one embodiment, I/O device 420 is a modem for enabling wired or wireless communications between system 400 and an external network such as, but not limited to, the Internet. A more detailed discussion of the present technology is found below.

Referring still to FIG. 4, various other components are depicted for system 400. Specifically, when present, an operating system 422, applications 424, modules 426, and data 428 are shown as typically residing in one or some combination of computer usable volatile memory 408, e.g. random access memory (RAM), and data storage unit 412. However, it is appreciated that in some embodiments, operating system 422 may be stored in other locations such as on a network or on a flash drive; and that further, operating system 422 may be accessed from a remote location via, for example, a coupling to the internet. In one embodiment, the present technology, for example, is stored as an application 424 or module 426 in memory locations within RAM 408 and memory areas within data storage unit 412. The present technology may be applied to one or more elements of described system 400. For example, a method for controlling frequency of data transfer of an electronic device may be applied to operating system 422, applications 424, modules 426, and/or data 428.

The computing system 400 is only one example of a suitable computing environment and is not intended to suggest any limitation as to the scope of use or functionality of the present technology. Neither should the computing environment 400 be interpreted as having any dependency or requirement relating to any one or combination of components illustrated in the example computing system 400.

The present technology may be described in the general context of computer-executable instructions, such as program modules, being executed by a computer. Generally, program modules include routines, programs, objects, components, data structures, etc., that perform particular tasks or implement particular abstract data types. The present technology may also be practiced in distributed computing environments where tasks are performed by remote processing devices that are linked through a communications network. In a distributed computing environment, program modules may be located in both local and remote computer-storage media including memory-storage devices.

Although the subject matter has been described in a language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for controlling frequency of data transfer of an electronic device, said method comprising:
   fetching a time stamp over a network connection, wherein said time stamp is not modifiable at said electronic device;
   storing said time stamp at said electronic device;
   in response to a request to transfer a first digital content, determining whether a predetermined time interval since a most recent transfer of said first digital content has elapsed; and
   if said predetermined time interval has not elapsed, blocking said transfer of said first digital content.

2. The method as described in claim 1 wherein said time stamp is comprised within a digital certificate.

3. The method as described in claim 1 wherein said time stamp is comprised within a counter stored in a portion of a memory device of said electronic device that is inaccessible by a user.

4. The method as described in claim 3 wherein said memory device is comprised within a Trusted Platform Module (TPM) microcontroller.

5. The method of claim 1 wherein said fetching a time stamp over a network connection comprises:
   establishing an Internet connection;
   accessing a trusted time stamp generator over said Internet connection; and
   retrieving said time stamp from said trusted time stamp generator.

6. The method as described in claim 1 wherein said request is for a transfer to a second electronic device, and wherein said method further comprises:
   comparing said time stamp to a second time stamp stored at said second electronic device, wherein said second time stamp is not modifiable at said second electronic device;
   if said time stamp is older than said second time stamp, replacing said time stamp with said second time stamp.

7. A data transfer rate reducer for controlling frequency of data transfer of an electronic device, said data transfer rate reducer comprising:
   a time stamp fetcher configured to fetch a time stamp over a network connection from a trusted clock, wherein said time stamp is not modifiable at said electronic device;
   a time stamp store configured to store said time stamp at said electronic device;
   a time interval determiner configured to determine whether a predetermined time interval since a most recent transfer of a first digital content has elapsed, in response to a request to transfer said first digital content; and
   a transfer blocker configured to block said transfer of said first digital content if said predetermined time interval has not elapsed.

8. The data transfer rate reducer of claim 7 wherein said time stamp is comprised within a digital certificate.

9. The data transfer rate reducer of claim 7 wherein said time stamp is comprised within a portion of a memory device of said electronic device that is inaccessible by a user.

10. The data transfer rate reducer of claim 9 wherein said memory device is comprised within a TPM microcontroller.

11. The data transfer rate reducer of claim 7 wherein said time stamp fetcher comprises:
   an Internet connector configured to establish an Internet connection;
   a trusted time stamp generator accessor configured to access a trusted time stamp generator over said Internet connection; and
   a time stamp retriever configured to retrieve said time stamp from said trusted time stamp generator.

12. The data transfer rate reducer of claim 7 wherein said data transfer rate reducer further comprises:
   a time stamp comparer configured to compare said time stamp to a second time stamp stored at a second electronic device, wherein said request is for a transfer to said second electronic device, wherein said second time stamp is not modifiable at said second electronic device; and
   a time stamp replacer configured to replace said time stamp with said second time stamp if said time stamp is older than said second time stamp.

13. A non-transitory computer-usable storage medium having computer readable program code stored thereon for causing a computer system to perform a method for controlling frequency of data transfer of an electronic device, said method comprising:
   fetching a time stamp over a network connection, wherein said time stamp is not modifiable at said electronic device;
   storing said time stamp at said electronic device; in response to a request to transfer a first digital content, determining whether a predetermined time interval since a most recent transfer of said first digital content has elapsed; and
   if said predetermined time interval has not elapsed, blocking said transfer of said first digital content.

14. The computer-usable storage medium as described in claim 13 wherein said time stamp is comprised within a digital certificate.

15. The computer-usable storage medium as described in claim 14 wherein said request is for a transfer to a second electronic device, and wherein said method further comprises:
   comparing said time stamp to a second time stamp stored at said second electronic device, wherein said second time stamp is not modifiable at said second electronic device;
   if said time stamp is older than said second time stamp, replacing said time stamp with said second time stamp.

16. The computer-usable storage medium as described in claim 13 wherein said time stamp is comprised within a counter stored in a portion of a memory device of said electronic device that is inaccessible by a user.

17. The computer-usable storage medium as described in claim 16 wherein said memory device is comprised within a tamper resistant Trusted Platform Module (TPM) microcontroller.

18. The computer-usable storage medium as described in claim 13 wherein said fetching a time
   stamp over a network connection comprises: establishing an Internet connection; accessing a trusted time stamp generator over said Internet connection; and retrieving said time stamp from said trusted time stamp generator.

* * * * *